INVENTOR
PAUL FARKAS

ATTORNEY

United States Patent Office 3,556,575
Patented Jan. 19, 1971

3,556,575
TAMPERPROOF SEAL
Paul Farkas, Fair Lawn, N.J., assignor to Thomas & Betts Corporation, Elizabeth, N.J., a corporation of New Jersey
Filed Nov. 15, 1968, Ser. No. 776,158
Int. Cl. B65d 55/06, 33/34, 27/30
U.S. Cl. 292—307
9 Claims

ABSTRACT OF THE DISCLOSURE

The invention is directed to a tamperproof seal which can be installed or removed without tools and which readily shows when the seal has been tampered with. The seal is comprised of an elongated body portion coupled by a weakened portion to a seal portion. The seal portion extends to a locking head member, shrouded such as to prevent the intrusion of tools or other devices onto the head to unlock the seal. Excess pressure upon the seal ruptures the weakened portion to show tampering.

BACKGROUND OF THE INVENTION

Field of the invention

The invention is directed to the field of providing seals for mail bags, pouches, and the like to prevent unwanted tampering with their locking mechanisms to readily show that such seals have been tampered with and attempts made to open them.

Description of the prior art

Prior art tamperproof seals required the use of cord, or metal bailing bands, requiring a seal member to be affixed thereupon with a special tool in crimping relationship. If it were desired to open the pouch, or mail bag, it was necessary to cut the metal mailing band, or the cord, or to destroy the seal. In each of these instances a tool was required both for the installation of the sealing member and for its removal.

SUMMARY OF THE INVENTION

The present invention overcomes the difficulties noted above with respect to prior art tamperproof sealing devices by providing a sealing device which can be installed and removed without the necessity for tools. The instant sealing device prevents tampering and shows when any attempt has been made to tamper with the seal. This is accomplished by providing a unitary device having an elongated strap body portion having a free tail end thereof tapered for insertion into a locking head member placed at the opposite end of the strap body portion. Intermediate the head member and the free tail end portion is placed a sealing portion, which is inserted in the lock to be sealed, and a weakened intermediate coupling section between the sealing portion and the strap body portion. When installed, attempts to apply forces to the seal in order to separate same, or to tamper with same, will cause severence of the coupling section and will immediately indicate that the seal has been tampered with. To prevent attempts at releasing the locking mechanism of the head end portion a sealing member, contained upon the sealing portion, is positioned within an enlargement in the transverse aperture of the locking head member and locked in position upon installation of sealing member. A shroud is provided adjacent the opposite end of the locking head member to prevent the passage of tool to the head member to release a locking mechanism. A slot is provided in the body portion of the strap to permit a finger to be inserted therein to apply pressure to the strap to permit it to be opened without the necessity for cutting the strap thus requiring tools. It is therefore an object of this invention to provide an improved tamperproof seal.

It is yet another object of this invention to provide an improved tamperproof seal where attempts to tamper with the device are prevented by the structure of the device and wherein any attempt to tamper with the device will result in destruction of the seal immediately showing that tampering has occurred.

It is still another object of this invention to provide an improved tamperproof seal having a locking head member containing a transverse aperture therethrough with a locking mechanism therein partially blocking the transverse aperture and seal members at both entrances to the transverse aperture to prevent the intrusion of devices for tampering with the locking mechanism.

It is still another object of this invention to provide a tamperproof seal which can be installed and removed without the necessity for tools.

Other objects and features of the invention will be pointed out in the following description and claims and illustrated in the accompanying drawings, which disclose, by way of example, the principles of the invention, and the best mode which has been contemplated for carrying it out.

BRIEF DESCRIPTION OF THE DRAWING

In the drawings:
FIG. 4 is a perspective view of the seal of FIG. 1 installed upon a mail pouch, or the like.

Similar elements are given similar reference characters in each of the respective figures.

DESCRIPTION OF THE PREFERRED EMBODIMENTS

Figure 1:
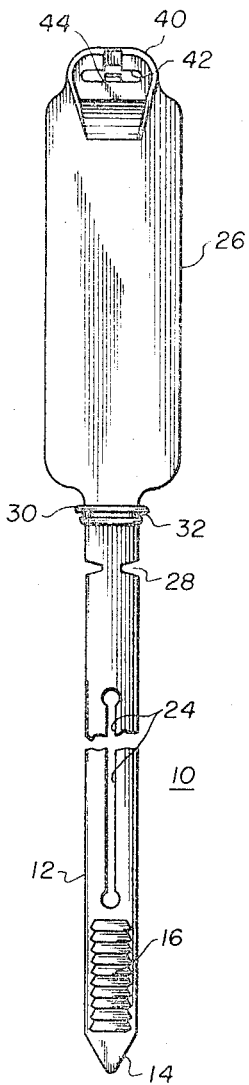
FIG. 1 is a front elevation of a tamperproof seal constructed in accordance with the concepts of the invention.
Figure 2:
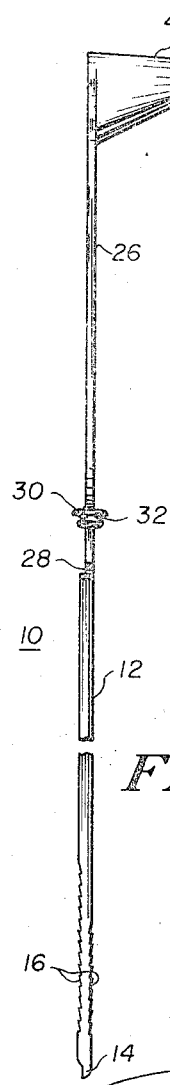
FIG. 2 is a side elevation of the tamperproof seal of FIG. 1.
Figure 3:
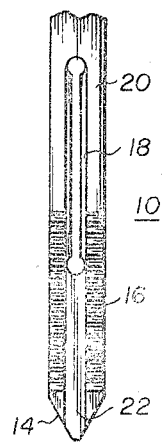
FIG. 3 is a rear elevation of a portion of the strap body of the seal of FIG. 1.

Turning now to FIGS. 1, 2 and 3 there is shown a tamperproof seal 10 constructed in accordance with the concepts of the invention. The seal 10 has an elongated strap body portion 12 which terminates in a free tail end 14. The plurality of ribs, or ridges 16, are formed in the free tail end portion 14 and may be on either surface thereof. As is shown in FIG. 2 the ribs, or ridges, 16 exist in both surfaces of the free tail end 14. It is not necessary, however, that ribs, or ridges, 16 be placed on both surfaces and they may be placed on either surface as desired. In addition, the ribs 16 on the back surface 18 of the strap body portion 12 do not extend across the entire width of the strap body portion 12, but extend only within the longitudinal ribs 20. Longitudinal ribs 20 are separated by a channel 22 to permit free passage of the strap body portion 12 with respect to the locking tongue as will be described below. Placed within the strap body portion 12 is a slot 24 into which a finger may be inserted to permit the application of forces to the strap body portion 12 to permit its severing as will be described below.

The strap body portion 12 is coupled to the seal portion 26 via a weakened coupling section 28. The weakened coupling section 28 may be formed by notching the strap body portion 12 or by scoring or the like. As will be described below, attempts to open the seal 10, or to tamper therewith, as well as when it is desired to remove the seal, forces applied to the seal 10 will result in the severance of the seal portion 26 from the strap body portion 12 at the weakened coupling section 28. Intermediate the seal portion 26, and the weakened coupling section 28, is a sealing member 30 having placed therein a recess 32. As will be described below, the sealing member 30 will fit into an enlargement of a transverse aperture within the head member and will seat itself so that the recess 32 engages a rib on such enlargement and causes the sealing member 30 to be locked into position. At the opposite end of the seal portion 26, from that upon which the sealing member 30 is found, there is found a locking head member 40. Locking head member 40 has a transverse aperture 42 therethrough and a locking metallic tongue 44 therein. Although the locking tongue 44 is found in the lower portion of the transverse aperture 42, it should be understood that it may be located in any position along the inner surface of the transverse aperture 42.

Figure 4:
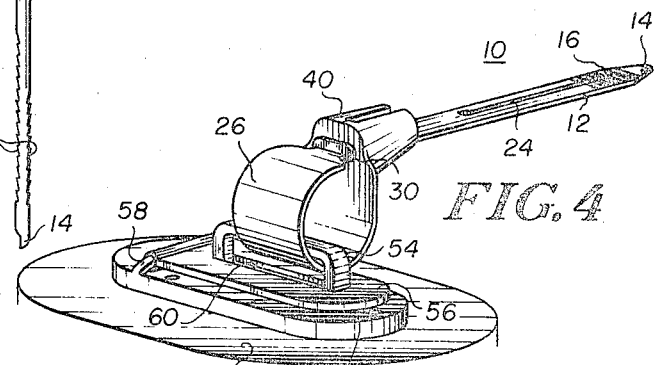

Turning now to FIG. 4, the manner of utilization of the seal of FIGS. 1 through 3 is described. In FIG. 4 there is represented a mail bag 50 having thereon a locking mechanism 52 which comprises a looped member 54 which fits through a hasp 56. The hasp 56 is anchored to the mechanism 52 by means of the pivotal mount 58 which is positioned so that the slot 60 of the hasp 56 will be positioned over the looped member 54. Seal 10 will then be positioned within the looped member 54 to prevent the hasp 56 from being released and thereby permitting opening of the mail sack 50. The free tail end portion 14 of the strap body portion 12 will then be passed through the transverse aperture 42 of the head member 40 and pulled up tight until the seal member 30 locks into position within the enlargement as will be described below with reference to FIG. 5. At this position, as will be described below with reference to FIG. 5, the metallic tongue 44 will engage the coupling section 28 and the seal will be completed.

Figure 5:
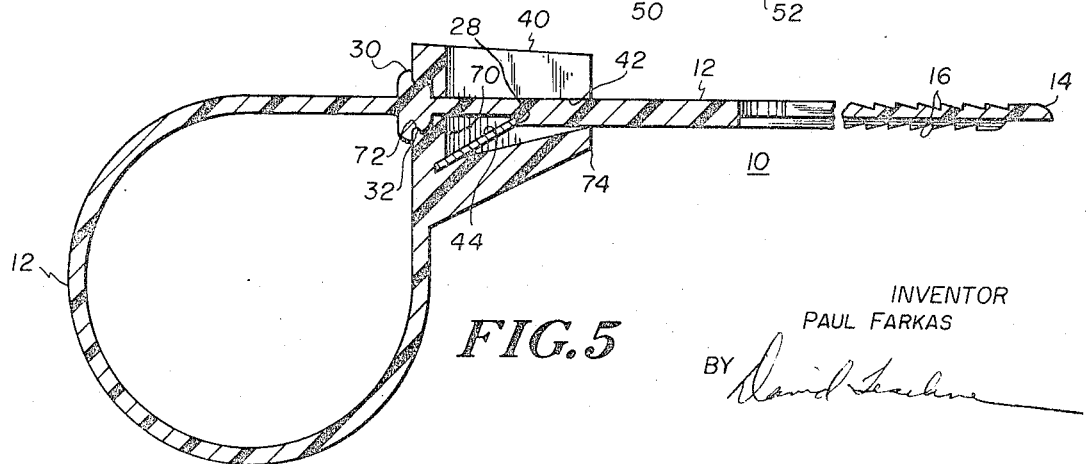
FIG. 5 is a side view, in section, of the seal of FIG. 1 in the installed condition as shown in FIG. 4.

Turing now to FIG. 5 the mechanism for locking of the seal 10 of FIG. 1 is now described. As can be seen from the figure the head portion 40 has a transverse aperture 42 therethrough which terminates in an enlargement 70 having a rib 72 at the entrance thereto. The rib 72 is made to engage the recess 32 of the sealing member 30. In addition, it should be noted that the free end of the metallic tongue 44 is permitted to engage the weakened portion of the coupling section 28. It should also be noted that the portion of the head member 40, adjacent the tail end 14 is formed as a shroud 74 providing no spacing between the transverse passage 42 and the strap body portion 12 when the strap body portion 12 is placed within the transverse aperture 42. Because of the closeness of the fit between the shroud 74 and the strap body portion 12 it is not possible to insert any type of instrument, or thin knife or the like, between the shroud 74 and the strap body portion 12 along the transverse aperture 42 and thus release the locking mechanism 44. Further, it is not possible to enter the transverse aperture 42 to reach the metallic tongue 44 from the rear portion because sealing member 30 has been placed within the enlargement 70 and locked there by means of the rib 72 engaging the recess 32. Thus, it is not possible, with the use of instruments, to dislodge the seal 10. Any attempt to apply force to the looped portion of the strap body 12 will cause the metallic tongue 44 to dig into the already weakened coupling section 28 and will cause it to be severed at that point. The severance of the seal 10 in that manner will cause the looped strap body portion 12 to act as a spring and withdraw the sealing member 30 from the enlarged portion 72 immediately, indicating that the seal has been tampered with.

In a similar manner the application of excessive force to the strap body portion 12 will cause a severance of the strap body portion 12 at the weakened coupling section 28 due to the resistance of such pull by the sealing member 30 against the portion of the head member 40. If it is desired to remove the seal entirely from the mail bag, as when the mail bag is to be opened by postal authorities, a finger will be inserted through the slot 24 and it will be pulled until such point as the seal 10 will break at the weakened coupling section 28 thus permitting the seal 10 to be opened. Thus, there has been showed and described a tamperproof seal which can be installed and removed without the necessity for tools and which will immediately indicate that the same has been tampered with, or has in some way been opened.

While there have been shown and described and pointed out the fundamental novel features of the invention as applied to the preferred embodiment, it will be understood that various omissions and substitutions and changes of the form and detail of the device illustrated and in its operation may be made by those skilled in the art, without departing from the spirit of the invention.

The embodiments of the invention in which an exclusive property or privilege is claimed are defined as follows:

1. A tamperproof seal for mail bags and the like comprising: an elongated strap body portion having a free tail end; a head member having a transverse aperture therein to accept said strap body portion therethrough; a seal portion coupled at one end to said head member; a coupling section coupling said seal portion at its other end to said strap body portion; said coupling section being weakened to permit forces exerted upon said seal after same has been locked to sever the strap body portion from said seal portion indicating the seal has been tampered with; and locking means in said head member, extending into and partially blocking said transverse aperture; said locking means engaging said coupling section after said free tail end of said strap body portion is looped about the loop of a loop-hasp lock and passed through said transverse aperture.

2. A seal, as defined in claim 1, further comprising a slot in said strap body portion for insertion therein of a finger whereby forces may be applied to the strap body portion to sever the seal at the coupling section and release the seal.

3. A seal, as defined in claim 1, wherein said seal portion and said strap body portion are of different widths and the coupling section is weakened by notching the seal at the joinder of said seal portion to said strap body portion.

4. A seal, as defined in claim 1, wherein said coupling section is weakened by scoring the seal at the juncture of said seal portion to said strap body portion.

5. A seal, as defined in claim 1, wherein said locking means is a metallic tongue having a knife edge thereon, said tongue being embedded into said head member adjacent said transverse aperture; said tongue being deflected by said strap body portion as same is drawn through said aperture and engaging said coupling section when said seal is locked, said tongue causing said coupling section to be severed when forces are applied to said seal in a direction opposite to the direction of deflection of said tongue.

6. A tamperproof seal for mail bags and the like comprising: an elongated strap body portion having a free tail end; a head member having a transverse aperture therein to accept said strap body portion therethrough; said transverse aperture in said head member terminates in an enlargement adjacent one of its ends; a rib on said head member adjacent said enlargement and a face of said head member; a seal portion coupled at one end to said head member; a coupling section coupling said seal portion at its other end to said strap body portion; and a locking means in said head member, extending into and partially blocking said transverse aperture; said locking means engaging said coupling section after said free tail end of said strap body portion is looped about the loop of a loop-hasp lock and passed through said transverse aperture.

7. A seal, as defined in claim 6, further comprising a seal member coupled to said seal portion and proportioned to fit within said enlargement; said seal member further comprising a recess thereon to accept said rib therein to lock said seal member to said head member blocking said transverse aperture.

8. A tamperproof seal for mail bags and the like comprising: an elongated strap body portion having a free tail end; a head member having a transverse aperture therein to accept a strap body portion therethrough; a seal portion coupled at one end to said head member; a coupling section coupling said seal portion at its other end to said strap body portion; a locking means in said head ember, extending into and partially blocking said transverse aperture; said locking means engaging said coupling section after said free tail end of said strap body portion is looped about the loop of a loop-hasp lock and passed through said transverse aperture; and a shroud coupled to said head member; said shroud having a transverse aperture therethrough communicating with the transverse aperture of said head member; said shroud transverse aperture being proportioned such that with said stap body portion therein access to said locking means is prevented.

9. A tamperproof seal for mail bags and the like comprising: an elongated strap body portion having a free tail end; a head member having a transverse aperture therein to accept said strap body portion therethrough; a seal portion coupled at one end to said head member; a coupling section coupling said seal portion at its other end to said strap body portion; a metallic tongue locking means in said head member, extending into and partially blocking said transverse aperture; said locking means engaging said coupling section after said free tail end of said strap body portion is looped about the loop of a loop-hasp lock and passed through said transverse aperture; and a shroud coupled to said head member; said shroud having a transverse aperture therethrough communicating with the transverse aperture of said head member; said shroud transverse aperture being proportioned such that with said strap body portion therein access to said metallic tongue is prevented.

References Cited

UNITED STATES PATENTS

| 2,368,613 | 2/1945 | Perrotta | 292—318 |
| 2,508,660 | 5/1950 | Buell | 292—317 |
| 2,977,145 | 3/1961 | Rifkin | 292—322X |
| 2,979,794 | 4/1961 | Bartolo | 24—17 |
| 3,086,265 | 4/1963 | Orenick | 24—30.5 |
| 3,214,808 | 11/1965 | Litwin | 24—16 |
| 3,416,198 | 12/1968 | Geisinger | 24—150 |

FOREIGN PATENTS

| 654,143 | 5/1963 | Italy | 292—307 |

MARVIN A. CHAMPION, Primary Examiner

E. J. McCARTHY, Assistant Examiner

U.S. Cl. X.R.

24—16, 30.5; 292—318